Oct. 30, 1956  C. F. TAYLOR ET AL  2,768,615
FUEL INJECTION SYSTEMS
Filed April 16, 1953  3 Sheets-Sheet 1

INVENTORS.
CHARLES FAYETTE TAYLOR
BLAKE REYNOLDS
BY
J. H. Grahame
ATTORNEY

INVENTORS.
CHARLES FAYETTE TAYLOR
BLAKE REYNOLDS
BY
*J. H. Grahame*
ATTORNEY

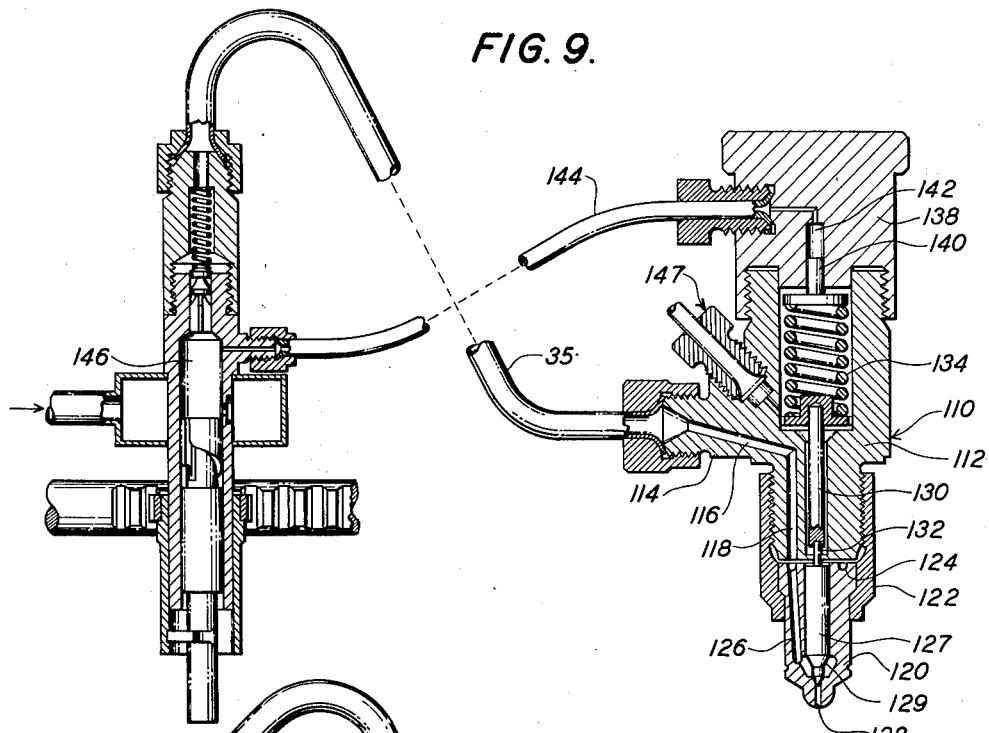
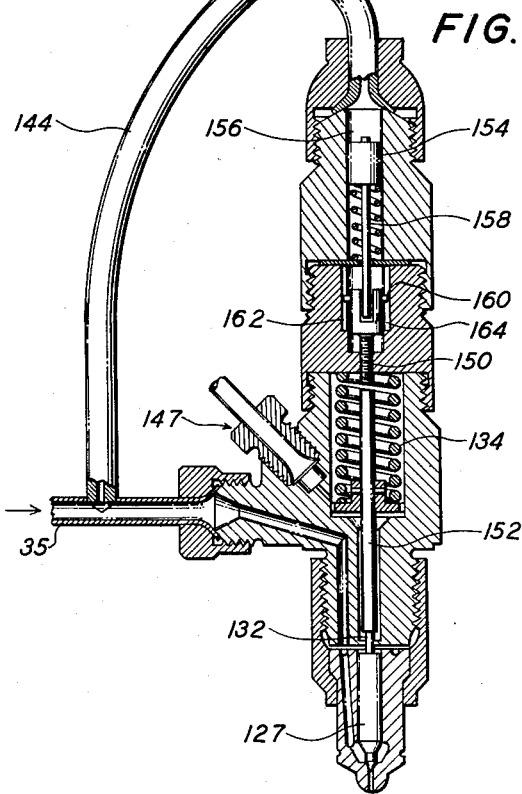
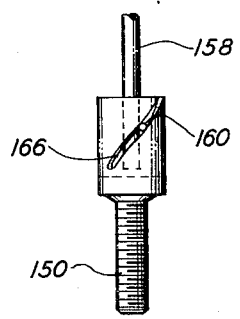

United States Patent Office 2,768,615
Patented Oct. 30, 1956

2,768,615

FUEL INJECTION SYSTEMS

Charles Fayette Taylor, Brookline, Mass., and Blake Reynolds, Riverside, Conn., assignors to Texaco Development Corporation, New York, N. Y., a corporation of Delaware Application April 16, 1953, Serial No. 349,204

5 Claims. (Cl. 123—32)

This invention relates to fuel injection systems for internal combustion engines and particularly to methods and apparatus for controlling the injection of fuel in such systems.

The injection systems of our invention are primarily useful in engines employing the improved combustion process disclosed in U. S. Patent No. 2,484,009 which was granted to E. M. Barber on October 11, 1949. In a preferred form of this improved combustion process, the oxidizing gas (say air) is caused to swirl around the cylinder of the engine during the compression stroke at a controlled rate with respect to the speed of the engine. Fuel to be burned in the engine is injected under pressure during each cycle of operation of the engine. The injected fuel is formed into a patch of combustible mixture which is confined in one direction by the oxidizing gas swirling toward the patch and containing little or no vaporized fuel so that it is incombustible. The patch is confined on the other side by gaseous products of combustion travelling away from a flame front at the edge of the patch where the mixture is burned substantially as fast as it is formed. Combustion is confined to and completed at the leading edge of the patch. Thus, during each cycle of operation of the engine a patch of combustible mixture is progressively formed and consumed in a localized area of the cylinder. As a result, little or no "end gases" are permitted to exist and even when existent are not exposed to the pressure and the temperature for the time required for spontaneous ignition to occur. Consequently "ping" or "knock" is inhibited even with fuels with low anti-knock value at high compression ratios.

In a preferred arrangement for carrying out this combustion process, the oxidizing air is caused to swirl around the interior of the cylinder by introducing it through an intake valve which is provided with a shroud or through ports which are inclined with respect to the side wall of the cylinder. The swirl rate of the air is several times (say 4 to 9) the speed of the engine in R. P. M. The fuel to be burned is injected into a localized segment of the swirling air mass during each compression stroke for a period which is not substantially more than the time required for the air mass to complete one swirl. At full power, the fuel is injected into the air stream during about the time required for the air to complete one swirl around the cylinder, say during about 55 crank angle degrees if the swirl rate of the air is 6 times crankshaft R. P. M., so that the time required for each swirl is 60 degrees of crank angle.

As the speed of the engine increases, the swirl rate of the oxidizing air with respect to the engine speed decreases in accordance with the laws of fluid mechanics. Also, when conventional jerk-pump fuel injection systems are employed, the duration of fuel injection with respect to the speed of the engine increases with increases in the speed of the engine in R. P. M. because of the small orifices at the valve of the pump and at the nozzle of the fuel injector.

We have found that it is desirable to vary the duration of injection automatically as a function of the swirl rate of the oxidizing gas in order to obtain optimum operation of the engine at different speeds.

In accordance with our invention, changes in the swirl rate of the oxidizing air with respect to engine speed, including the effect of density changes, are matched by corresponding changes in injection duration with respect to engine speed.

The quantity of fuel and duration of injection required to obtain maximum power or efficiency at one engine speed can be obtained by varying the area of the orifice of the fuel injector nozzle, by varying the initial volume of fuel to be injected, and by varying the pumping rate of the fuel injector pump. There is a wide variety of combinations of these factors which will satisfy the requirements at one engine speed. However, for a variable speed engine, the combinations of factors which meet the requirements of the fuel injection system are limited, and the various requirements can be defined in terms of empirical factors.

The principal factors affecting the performance of a jerk-pump are as follows:

(a) The relative volume of fuel delivered—i. e. the volume of fuel delivered divided by the total compression volume.

(b) The squirt factor—i. e. the nominal Mach number of flow of fuel through the nozzle orifice assuming that the fuel is incompressible. The squirt factor is defined by the following equation:

$$\sigma = \frac{(V/D)N}{C_s A_e}$$

where (V/D) is the average pumping rate of the fuel injector pump in volume displaced per crank angle degree.
N is the engine speed in R. P. M.
$C_s$ is the acoustic velocity in the fuel.
$A_e$ is the effective area of the orifice-valve combination through which the fuel must flow.

(c) The valve-opening pressure of the valve through which the fuel must flow.

(d) The duration index or per cent change of duration of injection divided by per cent change of speed.

The factors of primary importance are the relative volume and the squirt factor. The relative volume may be controlled by varying the initial volume of the fuel which is compressed. The squirt factor may be controlled by varying the pumping rate of the fuel pump or by varying the effective area of the orifice-valve combination of the nozzle through which the fuel must pass before it is injected into a cylinder of the engine.

The injection presure can be controlled through the combination of (a), (b) and (c) above by:

(1) Varying the initial volume of fuel to be compressed in the fuel pump; and/or (2) Varying the effective area of the orifice-valve combination of the nozzle in the fuel injection system, and/or varying the shape of the cam and/or the diameter of the plunger of the fuel pumps which determine the pumping rate; and/or (3) Varying the valve-opening pressure of the nozzle valve in the fuel injection system.

We prefer to employ a low pressure fuel injection system operating between 500 and 4000 pounds per square inch, which meets the following specifications:

(a) The relative volume being higher than that for conventional diesel engines but lower than that employed in conventional unit injection systems.

(b) A squirt factor of from 0.15 to 0.30 at maximum operating speed.

(c) A valve-opening pressure of from 100 to 2000 pounds per square inch. Thus, for a pintle type valve about 1000 to 2000 pounds per square inch, and for a ball type check valve about 100 to 2000 pounds per square inch.

(d) A duration index of from 0.15 to 0.75.

The invention is explained with reference to the drawings, in which.

Figure 3:
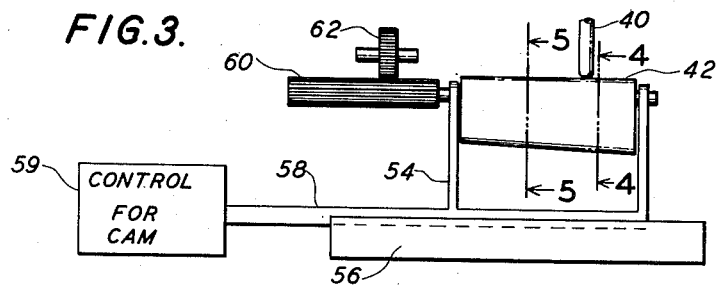
Fig. 3 shows a cam for actuating the fuel injector pump of Fig. 1 so as to control the duration of injection with respect to the speed of the engine and the rate of air swirl.
Figure 4:
Figure 5:

Figs. 4 and 5 are sectional views along lines 4—4 and 5—5 of Fig. 3; and

Figs. 6 to 12 show various other ways for controlling the duration of injection with respect to the speed of the engine and the rate of air swirl.

Figure 1:
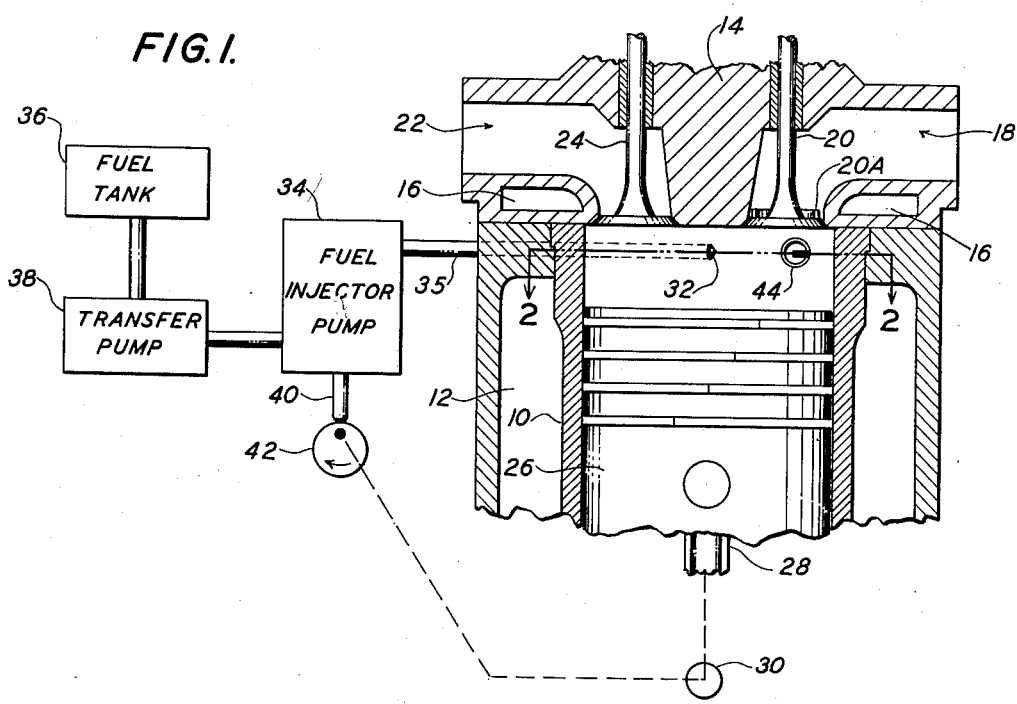
Fig. 1 illustrates a fuel injection system for an engine employing the improved combustion process with which this invention is primarily concerned.

The engine illustrated in Fig. 1 is a four-cycle engine of the general type disclosed in U. S. Patent No. 2,484,009.

The engine comprises a cylinder 10 provided with a cooling jacket 12, and a head 14 provided with cooling channels 16. An air inlet port 18 opens into the cylinder through a poppet valve 20 which is provided with a semi-circular shroud 20A on one side.

Figure 2:
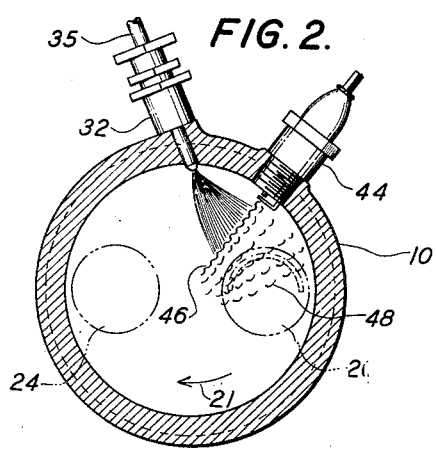
Fig. 2 is a sectional view along line 2—2 of Fig. 1.

The shroud is placed so that it causes the air to swirl rapidly around the axis of the cylinder as it is drawn past the valve during the intake stroke, as indicated by the arrow 21 in Fig. 2. Various swirl rates may be employed, but for four-cycle engines of the type here considered, a swirl rate of about six times the crankshaft speed in R. P. M. is preferable.

An exhaust port 22 in the head opens from the cylinder through an exhaust valve 24. A conventional piston 26 reciprocates in the cylinder. The piston is provided with a conventional connecting rod 28 which is connected to an ordinary crankshaft shown diagrammatically at 30.

A fuel injector nozzle 32 projects into the upper portion of the cylinder above the top dead center of the piston, and it is employed to spray fuel in the form of a fan or cone into the swirling air stream so as to impregnate a segment of the air stream located at one side of the diameter of the cylinder to form a patch of combustible mixture. The spray is directed downstream and across the swirling air stream, and the rate of injection is correlated with the velocity of the swirling air and the density of the air so as to impregnate the air at a controlled fuel-air weight ratio which may be about .04 to .08.

The nozzle 32 is connected to a fuel pump 34 through a fuel injection line 35. A fuel tank 36, and a transfer pump 38 serve to provide fuel for the pump 34.

The fuel pump is actuated by a stem or plunger 40, and the stem is moved by a cam 42. The cam is geared to the crankshaft, and it makes one complete revolution for each two revolutions of the crankshaft. The fuel injection system is arranged so that fuel injection is initiated well in advance of top dead center, say between 50 and 20 crank angle degrees.

A spark plug 44 is provided for igniting the combustible mixture in the cylinder. Preferably the spark plug is located about 30 to 45 degrees of radial angle downstream from the locus of fuel injection at the nozzle 32. The spark plug is employed to ignite the first increment of the combustible mixture substantially as soon as it is formed, and the spark plug is connected to an ignition system (not shown) which is arranged to provide an electric spark between the electrodes of the spark plug so as to effect such ignition. Once the fuel is ignited by the electric spark from the spark plug, the flames of the burning fuel ignite the remainder of the fuel which is injected during the combustion period.

Although spark ignition is preferred, the fuel may be ignited in various other ways, such as glow plug or compression ignition.

The combustion process which results from such operation is illustrated in Fig. 2. A flame front 46, which extends approximately radially across the cylinder, is formed during each combustion period. This flame front is located at the front of the patch of combustible mixture which is formed when the injected fuel mixes with the swirling air mass, and the flame front serves to burn the mixture substantially as fast as it is formed. The flame front tends to travel in a direction counter to the swirl of the air mass and toward the locus of the fuel injection. The combustion products 48 travel in the direction of swirl and away from the flame front. The patch of combustible mixture is thus confined on one side by an incombustible mass of the combustion products swirling away from the patch, and on the opposite side by an incombustible mass of air into which no fuel has been injected or which does not contain enough vaporized fuel to form a combustible mixture. Under these conditions, substantially no end gases are formed and even if formed do not attain a temperature and pressure for a sufficient length of time to result in spontaneous ignition. Consequently, "ping" or "knock" is inhibited even with fuels with low anti-knock value at high compression ratios.

In order to obtain maximum power and efficiency from the engine, fuel must be injected into the swirling air stream for a period which is approximately the time required for the air to complete one swirl. As discussed above, such operation can be effected with ease in engines which operate at a single speed. However, for a variable speed engine, the swirl rate of the oxidizing air with respect to the engine speed in R. P. M. decreases as the speed of the engine goes up. Also, when conventional jerk-pump fuel injection systems are employed, the duration of fuel injection with respect to the speed of the engine for any given setting of the pump control means increases with the speed of the engine in R. P. M. because of the restricted areas through which the fuel must pass before it is injected into the cylinder of the engine. Hence, it is necessary to correlate the duration of fuel injection with the swirl rate of the oxidizing air, in order to obtain maximum efficiency or power from the engine.

One way for controlling the duration of the fuel injection while holding constant the quantity of fuel injected is to vary the contour of the portion of the cam 42 which actuates the stem 40 of the fuel pump in accordance with variations in the speed of the engine, the overall stroke of the stem being maintained unchanged preferably. Figs. 3, 4 and 5 illustrate a suitable cam arrangement for effecting such operation. An elongated cam 42 is employed and its cross-sectional shape is arranged to provide the required movement for the stem 40 of the fuel pump. The cam 42 is mounted on a movable carriage 54 which rides on a fixed base 56. A shaft 58, which is connected to the carriage 54, is employed to vary the longitudinal position of the cam 42 with respect to the stem 40 of the fuel pump. The shaft 58 is moved in accordance with the speed of the engine by a control 59, which, for example, may be a governor coupled to the crankshaft so as to rotate in synchronism with the speed of the engine.

The cam 42 is geared to the crankshaft of the engine by means of an elongated gear 60 which is connected to the cam, and a fixed gear 62 which is coupled to the crankshaft. The gearing is arranged so that the cam makes one complete revolution for each two revolutions of the crankshaft.

By properly shaping the cross-sectional shape of the cam 42 along its length, the movement of the stem 40 and hence the duration of fuel injection may be controlled as desired, e. g. an increase in the speed of movement of the stem will tend to increase the rate of injection and so shorten the duration of injection, and vice versa.

As discussed above, the duration of fuel injection varies with the relative volume of the fuel injected. By varying the initial volume of the fuel to be compressed in the pump, the relative volume and hence the duration of injection can be controlled. The fuel pump shown in Fig. 6 illustrates one way of controlling the duration of injection in this manner.

Figure 6:
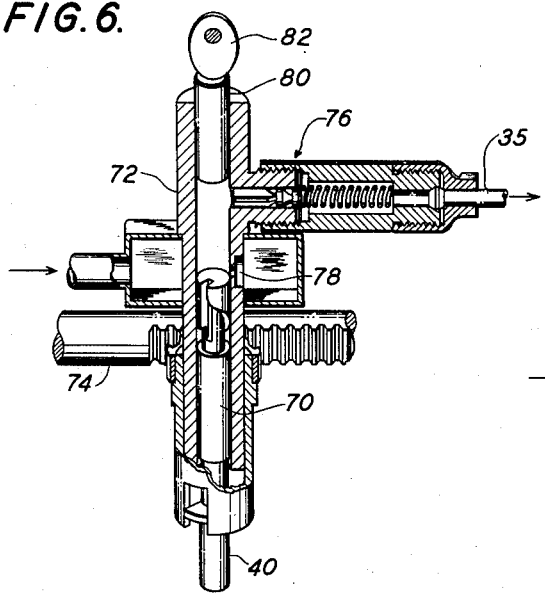

The fuel pump shown in Fig. 6 is a conventional type employed in diesel engines, except that it is provided with an arrangement for controlling the initial volume of the fuel which is to be compressed.

The fuel pump has a plunger 70 which is actuated by the stem 40. In this arrangement, a conventional cam is employed to actuate the stem 40, and a cam of the type shown in Figs. 3 to 5 is not required.

The plunger 70 reciprocates in a cylinder 72, and a rack 74 is provided for controlling the orientation of the plunger 70 in the cylinder so as to control the amount of fuel which is injected during each cycle of operation. Fuel is admitted through an inlet port 78, and it is transmitted through a valve 76 to the fuel injector nozzle. Port 78 also serves as a spill port to provide an exit for the fuel and precludes the flow of fuel through the valve 76 except during the portion of each cycle of operation when the port 78 is closed by the plunger 70.

An adjustable piston 80 is provided for controlling the initial volume of the compressed-fuel system. The position of the adjustable piston 80 is controlled by a cam 82, and the angular position of the cam 82 is controlled in accordance with the speed of rotation of the engine.

Thus, when the engine operates at a fixed speed, the cam 82 is located in a fixed position which serves to provide the proper initial volume in the pump required to achieve the desired duration of fuel injection. When the speed of the motor changes, the position of the cam 82 and the associated piston 80 are changed a corresponding amount so as to provide the required duration of fuel injection.

Figure 7:
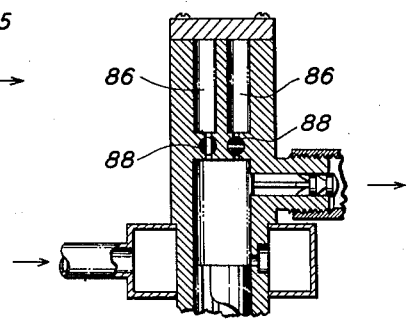

Fig. 7 shows how the pump of Fig. 6 may be modified to provide another arrangement for controlling the initial volume of the pump. A pair of chambers 86 are provided at the top of the compression chamber of the pump, and they are coupled to the compression chamber through a pair of valves 88.

Figure 8:
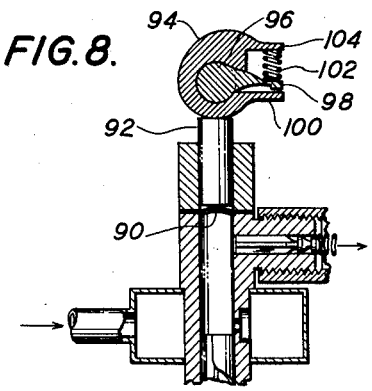

Fig. 8 shows a modification of the pump of Fig. 6 which serves to achieve approximately the same result as the arrangement of Fig. 6. A resilient diaphragm 90 is employed as the control means, rather than the piston 80 shown in Fig. 6. The deflection of the diaphragm is comparable to the compression of the auxiliary fuel volume employed in Fig. 6. The diaphragm is backed up by a follower 92 whose position is controlled by a cam 94. If the follower 92 is moved toward the diaphragm, less diaphragm deflection is permitted and a stiffer, or lower effective volume system is obtained.

Since the diaphragm returns to its natural position between each cycle of operation of the pump, the cam in this case does not have to work against a large force. The cam is journaled on a control shaft 96, and the angular position of the shaft 96 is controlled by the speed of the motor. A rigid stop 98 is affixed to the shaft 96 for controlling the position of an arm 100 on the cam. A compression spring 104 is located between the stop 98 and an upper arm 102 on the cam for adjusting the cam without forcing the follower 92 against the diaphragm when it is deflected. When the angular position of the control shaft 96 is adjusted in accordance with a change in engine speed, the cam 94 remains in its initial condition until the diaphragm returns to its neutral position, and then the spring moves the cam until the arm 100 abuts against the stop 98 on the control shaft.

The equilibrium pressure is the pressure at which fuel is discharged at the same rate at which it is pumped. At one particular speed of the engine, equilibrium pressure will equal the valve opening pressure. At that speed, the injection pressure remains constant throughout the injection period. Since no compression of the fuel in the injection system takes place during the injection period, the volume of fuel delivered equals the volume of fuel pumped.

For any higher speed, injection starts at valve opening pressure, but injection pressure then rises as the injection continues on each cycle. Therefore, fuel is being compressed and the volume of fuel delivered is less than the volume of fuel pumped.

The duration of fuel injection can be controlled to match the air swirl rate by controlling the relation between injection pressure and valve opening pressure. This may be achieved by controlling the valve-opening pressure of the nozzle valve or by controlling the effective area of the orifice-valve combination of the nozzle valve, as illustrated in Figs. 9 to 12.

Figure 10:
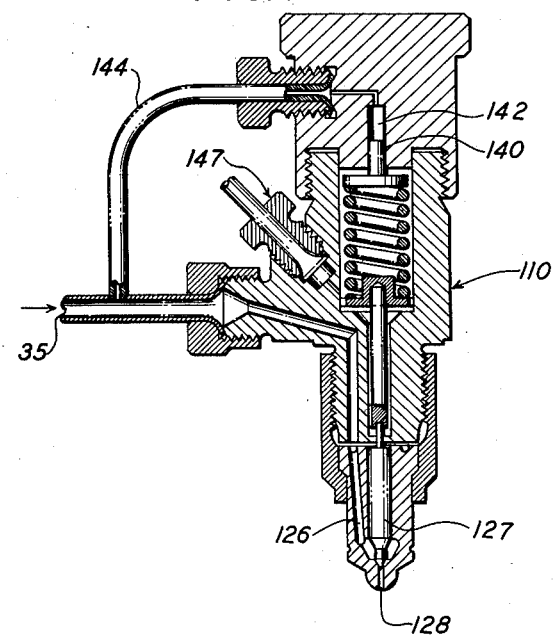

Figs. 9 and 10 illustrate arrangements for varying the valve-opening pressure of the nozzle valve in accordance with the speed of the engine.

The pressure developed in the fuel delivery system may be employed to control opening pressure of the nozzle valve. In the arrangement shown in Fig. 9, the average pumping pressure of the fuel pump is employed to control the valve-opening pressure of a pintle valve in the fuel injection nozzle.

The nozzle 110 illustrated in Fig. 9 is the general type disclosed in U. S. Patent No. 2,604,086 which was granted on July 22, 1952, to Villforth. The nozzle 110 comprises a body member 112 having a side boss 114 to which the fuel line 35 from the fuel pump is connected. The boss 114 is provided with a fuel channel 116 which communicates at its inner end with a downwardly extending fuel channel 118 in the body member.

A tip member 120 is held in engagement with the lower end of the body member by a coupling 122. The upper surface of the tip member 120 is provided with an annular groove 124 which registers with the lower end of the fuel channel 118. The groove 124 communicates in turn with a fuel passage 126 in the tip member.

A pintle valve 127 is located in the tip member and it serves to open and close an orifice 128 at the end of the tip member. The pintle valve 127 is provided with a conical surface 129 adjacent its lower end. The fuel pressure which is applied to the conical surface 129 through the passage 126 serves to open the valve when the force due to fuel pressure exceeds that due to the spring load on the valve.

A stem 130 bears at its lower end in loose-fitting engagement with the upper end of a pin 132 carried by the pintle valve 127. A spring load for the pintle valve 127 is provided by a spring 134 which is coupled to the pintle valve through the stem 130 and the pin 132.

A cap member 138 is located at the top of the nozzle assembly, and it is provided with a plunger 140 for varying the spring load on the pintle valve. A chamber 142 is provided for controlling the position of the plunger 140, and a capillary tube 144 is connected between the chamber 142 and the chamber 146 of the fuel pump. The capillary tube 144 serves to provide a fluid pressure in the chamber 142 which varies in accordance with the average pressure developed in the chamber 146 of the pump. Thus, the spring load on the pintle valve 127 of the nozzle and hence the valve opening pressure is varied in accordance with the variations in the pumping pressure, which in turn is governed by the speed of the engine. The duration of injection can be controlled as desired by properly proportioning the spring 134, the capillary tube 144, and the chamber 142.

A leakage coupling 147, which may be connected to a return line (not shown) is provided for returning any fuel leaking past the pintle valve to the source of supply of fuel, say to the fuel tank.

Fig. 10 shows an arrangement wherein the average pressure developed in the fuel injection line is employed to control the valve-opening pressure of a fuel injection nozzle 110 of the same type shown in Fig. 9. In this arrangement, the capillary tube 144 is coupled to the injection line 35 which is connected between the fuel pump and the nozzle, rather than being coupled to the compression chamber of the pump. As before, the capillary tube 144 serves to provide fluid pressure in the chamber 142 which varies in accordance with the speed of the engine. Thus, the plunger 140 serves to control the spring load on the pintle valve 127 in accordance with the pressure developed in the chamber 142. This controls the opening pressure of the valve and hence the duration of the fuel injection in accordance with the speed of the engine.

Fig. 11 shows an arrangement in which the effective area of the orifice-valve combination of the fuel injection nozzle is controlled by the average pressure developed in the fuel injection line.

The nozzle is the same general type as that illustrated in Fig. 9. However, the spring load which is provided by the spring 134 is not varied, but rather the upward limit of movement of the pintle valve is controlled so as to vary the effective area of the orifice-valve combination of the nozzle.

A threaded stop 150 controls the upward limit of movement of a stem 152 which bears at its lower end in loose-fitting engagement with a pin 132 carried by the pintle valve 127. The location of the stop 150 is controlled by a plunger 154, which in turn is controlled by the average fuel injection line pressure provided through the capillary tube 144 to a chamber 156.

The plunger 154 is connected to the stop 150 through a shaft 158 which is affixed to the plunger and a pin 160 which is affixed to the shaft 158. The pin 160 rides in a pair of slots 162 and 164 which extend longitudinally in the wall of the housing, and the pin 160 extends through inclined slots 166 in the upper portion of the stop 150, as shown in Fig. 12. Movement of the plunger 154 causes the pin 160 to move up or down in the inclined slots 166, thereby causing the threaded stop 150 to be adjusted in accordance with the average pressure developed by the fuel in the fuel injection line. As shown in Figs. 11 and 12, when the pressure in fuel line 35 tends to rise, movement of the pin 160 downwardly in slot 162 rotates stop 150 counterclockwise (when looking down on Fig. 12), and the right hand threads raise the stop to increase the extent of opening of valve 127 and thereby the effective area of the valve-orifice combination. This resulting increased area then tends to reduce the fuel line pressure back to the predetermined normal, whereby a substantially constant injection pressure is maintained in the fuel line during the fuel injection period on each cycle.

For engines employing the combustion process disclosed in U. S. Patent No. 2,484,009, it is preferable to cause the oxidizing air to swirl around the interior of the cylinder at a rate which is approximately six times the engine speed in R. P. M. If a swirl rate of six is provided at the middle of the range of speeds at which the engine is to be operated, the swirl rate is greater than six at lower speeds and it is lower than six at higher speeds.

For such engines, the duration of fuel injection should be varied approximately inversely in proportion to the swirl rate in order to obtain optimum operation of the engine. With such an arrangement substantially the same percentage of the swirling air mass is impregnated with fuel at all operating speeds for the engine. Since the swirl rate for such engines is determined by the speed of the engine in R. P. M., the duration of fuel injection may be varied inversely in proportion to the swirl rate by controlling the duration of injection with one of the arrangements shown in Figs. 3 to 12.

By way of example, the engine may be arranged to provide a swirl rate of six at an operating speed of 1800 R. P. M. At this swirl rate, the air makes one complete swirl for each 60 degrees of crank angle. A desirable duration of fuel injection for such operation is 55 degrees of crank angle. If the speed of the engine is increased to 3000 R. P. M., the swirl rate is less, say 5 or 72 degrees of crank angle per swirl. Under these conditions, the duration of fuel injection should be approximately 66 degrees of crank angle, i. e. 55 degrees times 6/5.

The foregoing description applies to the case of an unsupercharged engine. However, the present invention is also applicable to a supercharged engine operating with variable manifold pressure at constant or variable engine speed. This applies to an engine equipped with a centrifugal type of supercharger for the air intake, wherein the supercharger inlet is throttled for part load operation in order to reduce the horse power absorbed by the supercharger. It also applies to an engine equipped with the rotary lobed vane type of supercharger, such as a Rootes blower, wherein the supercharger is equipped with means for spilling some of the air before it reaches the cylinder for part load operation and thereby lowering the manifold pressure to reduce the horse power absorbed by the supercharger.

In either case, the present invention provides means for varying the rate of injection with the manifold density to maintain the desired localized fuel-air ratio of the mixture patch at constant speed or throughout the speed range.

In a 4-stroke engine equipped with a centrifugal supercharger, the boost or manifold pressure above ambient pressure varies as the square of the engine speed. The temperature of the air also increases at the same time, so that the increase in density of the air in the cylinder is somewhat less than the increase in manifold pressure. With supercharging, therefore, the density increases while the swirl rate decreases with an increase of speed, with the result that the rate of injection in accordance with the present invention is not decreased as rapidly as in the case of the unsupercharged engine described above.

Similarly, at constant speed, the manifold density may be varied with load, as pointed out above. In this case, the rate of injection is varied directly with manifold density to preserve the patch fuel-air ratio.

The requirements for change in the rate of injection for the supercharged engine are met by the apparatus of Figs. 3 and 6-9, with suitable modifications as described hereinbelow.

In the apparatus of Fig. 3, the change in injection rate is effected by a corresponding change in the pumping rate with change in engine speed as pointed out above. Thus, sliding the cam 42 to a steeper portion of the cam profile increases the pumping rate and also the injection rate. By merely altering and coordinating the cam profile over the length of the cam 42 for the somewhat different requirements of a supercharged engine, the injection rate is matched with the air density over the engine speed range. Thus, in the case of the supercharged engine, where the air density increases with an increase of speed which may be less than the decrease in swirl rate, the profile of the portion of the cam in operation at the upper engine speeds will be steeper than in the case of the unsupercharged engine.

At constant speed, as the manifold density is decreased for reduced load, a less steep portion of the profile of cam 42 of Fig. 3 is brought into play to decrease the injection rate in accordance with the decrease in manifold density.

When the arrangement of Fig. 3 is employed in a variable speed supercharged engine wherein the manifold pressure varies with the speed of the engine, it is preferable that the control 59 for the cam 42 position the cam 42 in accordance with the speed of the engine. When the arrangement of Fig. 3 is employed in a constant speed supercharged engine wherein the manifold pressure is varied with variations in the load on the engine, it is preferable that the control 59 for the cam 42 position the cam 42 in accordance with the manifold pressure of the engine. By way of example, the control 59 may be actuated by the mechanism of the supercharger or by a manifold pressure responsive device.

In the case of a supercharged engine employing a control of the type shown in Figs. 6—8, the system is designed so that the minimum relative volume matches the most highly supercharged condition. Then, as supercharge pressure is reduced at lower loads or speeds, the relative volume of the injection system is increased in order to decrease the injection rate. This is accomplished by the apparatus as shown with the further modification that the cams 82 or 94 or valves 88 are actuated by linkage under the joint control of the speed governor and a manifold pressure responsive device.

The controls of Figs. 9, 10 and 11 are normally used for an unsupercharged engine, but may be employed in the case of engines equipped with a supercharger. In such case, a decrease in orifice area or the valve opening pressure of the fuel nozzle is desirable where the injection rate is to be decreased appreciably for a large drop in manifold pressure.

In the case of supercharged engines, the maximum squirt factor as defined above is preferably raised to about 0.50 at maximum operating speed, which permits wider variations in rate of injection without requiring excessively large relative volume.

We claim:

1. In an internal combustion engine comprising a cylinder having a piston operating therein and providing a disc-shaped combustion space, intake means for said cylinder adapted to introduce air into said combustion space and impart a high velocity of swirling movement thereto, a fuel injection nozzle carried by said cylinder to inject fuel into said combustion space including a nozzle valve for opening and closing the discharge orifice thereof, means for supplying fuel thereto at a temperature and pressure such that at least a portion of the first increment of injected fuel vaporizes rapidly and forms with a localized portion of the swirling air a combustible fuel-air mixture with only a short travel of the fuel from said nozzle, said last mentioned means including a fuel pump having a pump plunger in the cylinder thereof and a delivery valve, an ignition device mounted on said cylinder and positioned within said combustion space out of the direct path of liquid fuel particles of said injected fuel but sufficiently close to said nozzle so that said combustible fuel-air mixture from said first increment of injected fuel contacts said ignition device substantially as soon as said combustible mixture is formed, means coordinated with engine operation for controlling the start of injection of fuel from said nozzle during the latter part of the compression stroke of said piston, means synchronized with engine operation to initiate combustion at the time said combustible mixture formed from said first increment of injected fuel reaches said means to initiate combustion and establish a flame front traveling in the opposite direction with respect to said swirling air, and means for controlling the rate and duration of injection of fuel following ignition to impregnate shortly in advance of the traveling flame front additional quantities of said swirling air at a controlled fuel-air ratio to progressively form additional combustible fuel-air mixture immediately in advance of the said traveling flame front which is ignited thereby and burned substantially as rapidly as formed to provide the power required on each cycle, whereby the formation of sufficient end gases consisting of combustible fuel-air mixture trapped by said flame front to cause spontaneous ignition and produce knock is prevented, the improvement which comprises means for the variation of the relationship between the rate and the duration of fuel injection for a particular load operation in accordance with changes in engine speed, whereby the air swirl rate deviates from a fixed ratio in relation to engine speed as the latter changes, thereby to maintain substantially constant the instantaneous fuel-air ratio of the impregnated portions of compressed swirling air as they swirl past said locus of fuel injection at various engine speeds and including engine controlled means for establishing the initial volume of the fuel injection system between the pressure side of the fuel pump plunger and the discharge orifice of the fuel injection nozzle so that during each period that fuel is being discharged through the fuel pump delivery valve, the only cyclic change in the volume of said system is accomplished by the displacement of the pump plunger and nozzle valve.

2. The improvement as defined in claim 1, wherein the means for the variation of the relationship between the rate and the duration of fuel injection for a particular load operation in accordance with changes in engine speed comprises a cam operatively positioned and controlled in accordance with changes in engine speed and an adjustable piston in the pump cylinder in contact with said cam and located in said cylinder by the position of said cam thereby to determine said initial volume of said fuel injection system.

3. The improvement as defined in claim 1, wherein the means for the variation of the relationship between the rate and the duration of fuel injection for a particular load operation in accordance with changes in engine speed comprises an engine speed controlled valve and a chamber auxiliary to the pumping chamber of the fuel pump and coupled thereto by the operation of said valve thereby to determine said initial volume of said fuel injection system.

4. The improvement as defined in Claim 1 wherein said fuel pump injects a predetermined quantity of fuel into a localized segment of said swirling air during a portion of the period required for said air to complete one swirl and includes means coupled to the crankshaft of said engine for actuating the fuel pump during each combustion cycle and for varying the relationship between the duration of fuel injection and the quantity of fuel injected per injection and means responsive to changes in the manifold density and engine speed for varying the rate of fuel injection and thereby the duration thereof for a given quantity per injection including a cam and an adjustable piston in the cylinder of said fuel pump located opposite the pump plunger thereof and in contact with said cam for operative positioning therein whereby said initial volume of said fuel injection system is established, and separate means responsive to the load requirements of said engine for establishing the quantity of fuel required per injection.

5. In an internal combustion engine having means for causing oxidizing gas to swirl around the interior of a cylinder of said engine during the compression stroke and an injection system, including a jerk-pump having a plunger and a cylinder, for injecting, into a localized segment of the swirling oxidizing gas during a portion of the period required for said gas to complete one swirl, a predetermined amount of fuel while varying the rate of its injection in accordance with changes in power requirements, the improvement which comprises means for varying the initial volume of the fuel subject to subsequent compression in said jerk-pump and thereby its rate of injection in coordination with changes in the speed of said engine and the manifold density thereby controlling the relationship between the duration of fuel injection and the amount of fuel injected with respect to the swirl rate of the oxidizing gas to maintain substantially constant the fuel-air ratio of said swirling oxidizing gas, said means for varying said initial volume comprising cam means responsive to said changes in power requirements and a piston positioned in the pump cylinder opposite the plunger thereof and in contact with said cam means whereby said initial volume of fuel changes only as the fuel is compressed and discharged from said jerk-pump.

References Cited in the file of this patent

UNITED STATES PATENTS

| | | |
|---|---|---|
| 1,319,857 | Edholm | Oct. 28, 1919 |
| 1,850,250 | Von Salis | Mar. 22, 1932 |
| 2,396,602 | Posch | Mar. 12, 1946 |
| 2,484,009 | Barber | Oct. 11, 1949 |

FOREIGN PATENTS

| | | |
|---|---|---|
| 797,772 | France | May 4, 1936 |